United States Patent
Agarwal et al.

(10) Patent No.: US 10,132,862 B1
(45) Date of Patent: Nov. 20, 2018

(54) CODE COVERAGE MAPPING

(71) Applicant: Cadence Design Systems, Inc., San Jose, CA (US)

(72) Inventors: Prashant Vardhan Agarwal, Noida (IN); Maneesh Agarwal, Noida (IN)

(73) Assignee: CADENCE DESIGN SYSTEMS, INC., San Jose, CA (US)

(*) Notice: Subject to any disclaimer, the term of this patent is extended or adjusted under 35 U.S.C. 154(b) by 28 days.

(21) Appl. No.: 15/216,492

(22) Filed: Jul. 21, 2016

(51) Int. Cl.
*G01R 31/00* (2006.01)
*G01R 31/317* (2006.01)
*G01R 31/3177* (2006.01)

(52) U.S. Cl.
CPC ... *G01R 31/31704* (2013.01); *G01R 31/3177* (2013.01); *G01R 31/31703* (2013.01)

(58) Field of Classification Search
None
See application file for complete search history.

(56) References Cited

U.S. PATENT DOCUMENTS

| | | | | |
|---|---|---|---|---|
| 9,477,585 B2* | 10/2016 | Ellis | | G06F 11/3688 |
| 9,628,366 B2* | 4/2017 | Majumdar | | H04L 43/50 |
| 2002/0019963 A1* | 2/2002 | Wright | | G01R 31/31908 714/733 |
| 2003/0225560 A1* | 12/2003 | Garcia | | G06F 17/5022 703/17 |
| 2006/0015313 A1* | 1/2006 | Wang | | G06F 17/5027 703/14 |
| 2007/0043548 A1* | 2/2007 | Arevalo | | G06F 17/5022 703/14 |
| 2008/0133205 A1* | 6/2008 | Adir | | G06F 17/5022 703/15 |
| 2008/0177968 A1* | 7/2008 | Emek | | G06F 17/5022 711/170 |
| 2009/0271167 A1* | 10/2009 | Zhu | | G06F 17/5027 703/14 |
| 2013/0227367 A1* | 8/2013 | Czamara | | G01R 31/3177 714/735 |

* cited by examiner

*Primary Examiner* — Daniel F. McMahon
(74) *Attorney, Agent, or Firm* — McDermott Will & Emery LLP (57) ABSTRACT

Methods and systems for code coverage mapping are provided. In one aspect, a method for code coverage mapping includes generating, by a user application executable by a computing device, a source-code handle corresponding to a transaction code. The source-code handle is communicated through an interface to a server emulating a design-under-test (DUT). Writing a value of the source-code handle to a signal in the DUT is facilitated to mark start of execution, by the user application, of one or more sequences of one or more instructions of the transaction code.

20 Claims, 6 Drawing Sheets

```
always
 @(negedge clk)
 begin
  case (din)
        3'b111:  dout = 3'b0;
        3'b010:  dout = 3'b01;
  endcase
 end
```

420

```
reg[8:0] _zy_ccov_block_1 =6'b0;
reg[8:0] _zy_ccov_block_2 =6'b0;
reg[5:0] sw_SrcTagSig =6'b0;

always
 @(negedge_zy_clk_x$ed_0)
 begin
  case (din)
   3'b111:
    begin                                           ⌐422
        _zy_ccov_block_1 = sw_SrcTagSig ;
        dout = 3'b0,
    end
   3'b010:
    begin                                           ⌐424
        _zy_ccov_block_2 = sw_SrcTagSig ;
        dout = 3'b01;
    end
  encase
 end
```

430

```
SourceHandleT CreateSourceHandle (const char* filename, int line)
{
    //Create a hashmap and generate a key for the
    Returns SourceTagInfoHandle
}
```

CODE COVERAGE MAPPING

TECHNICAL FIELD

The present disclosure generally relates to electronic design automation, and more specifically relates to code coverage mapping.

BACKGROUND

Code coverage is a measure of the degree to which a source code of a program is tested by a particular test suite. A high code coverage of a program is an indication of a more thorough performance of a test of the program, and a program with a high code converge has a lower chance of containing software bugs than a program with a low code coverage. Code coverage is commonly an important aspect of efficient metric driven verification of large electronic circuit designs. Verification coverage metrics using code coverage can be dependable tools for measuring progress of verification.

As part of a compiler flow, hardware description language (HDL) coverage, which is a form of code coverage, can be tracked by adding internal logic to the identified coverage items of the user HDL. Coverage counters are signals that are added in the internal logic of the HDL, and get populated when the design-under-test (DUT) runs on emulation hardware. The values of these counters can be fetched at any time during the run and dumped in a coverage database after mapping these counter signals to the original HDL. This database can then be analyzed by a coverage database reader/analysis tool (e.g., Incisive Metrics Center (IMC) tool).

The description provided in the background section should not be assumed to be prior art merely because it is mentioned in or associated with the background section. The background section may include information that describes one or more aspects of the subject technology.

SUMMARY

The disclosed system provides for code coverage mapping of a source code into a design-under-test (DUT) being emulated on a server. A source code handle corresponding to a transaction code is generated, and a value of the source-code handle is written through an interface into to a signal in the DUT to trigger execution of a sequence associate with the transaction code.

According to certain aspects of the present disclosure, a system for code coverage mapping is provided. The system includes a server that is configured to emulate a DUT. An interface couples the server to a computing device that is configured to execute software code including a user application. The user application is configured to generate a source-code handle and to use the interface to write a value of the source-code handle to a signal in the DUT to mark start of execution of a sequence by the user application.

According to certain aspects of the present disclosure, a method for code coverage mapping is provided. The method includes generating, by a user application executable by a computing device, a source-code handle corresponding to a transaction code. The source-code handle is communicated through an interface to a server emulating a DUT. Writing a value of the source-code handle to a signal in the DUT is facilitated to mark start of execution by the user application of a sequence associate with the transaction code.

According to certain aspects of the present disclosure, a non-transitory machine-readable media is provided. The non-transitory machine-readable storage medium includes machine-readable instructions for causing a processor to execute a method for code coverage mapping. The method includes generating a source-code handle corresponding to a transaction code. The source-code handle is communicated through an interface to a server emulating a DUT. Writing a value of the source-code handle to a signal in the DUT is facilitated to mark start of execution by the user application of a sequence associate with the transaction code. The source code handle includes a handle of a software code, and the transaction code represents a transaction between the software code and the DUT.

According to certain aspects of the present disclosure, a system for code coverage mapping is provided. The system includes means for generating a source-code handle corresponding to a transaction code. The system further includes means for communicating the source-code handle through an interface to a server emulating a DUT. The system further includes means for facilitating writing a value of the source-code handle to a signal in the DUT to mark start of execution by the user application of a sequence associate with the transaction code.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for code coverage mapping of a source code into a design-under-test (DUT) being emulated on a server. The mapping links the software coverage to hardware description language (HDL) or register transfer level (RTL) coverage, for example, by mapping the HDL (or RTL) code coverage to software code that transacted with the HDL (or RTL) code and triggered execution of one or more portions of the HDL (or RTL) code and/or mapping the software code to the HDL (or RTL) coverage. The disclosed system addresses a technical problem tied to DUT emulation and verification and allows the user to link the software code to the HDL (or RTL) coverage. This helps to detect whether a specific software code was able to improve the HDL (or RTL) code coverage. The disclosed solution is useful in hardware/software co-verification, for instance, when both software and hardware are in development stages. The disclosed system further allows minimizing the hardware, for example, by facilitating for the user to identify which blocks of the HDL (or RTL) code are most relevant to the software and which blocks are not used. This is important in identifying important verification metrics, which in turn leads to cutting down the verification time.

Example System Architecture

Figure 1:
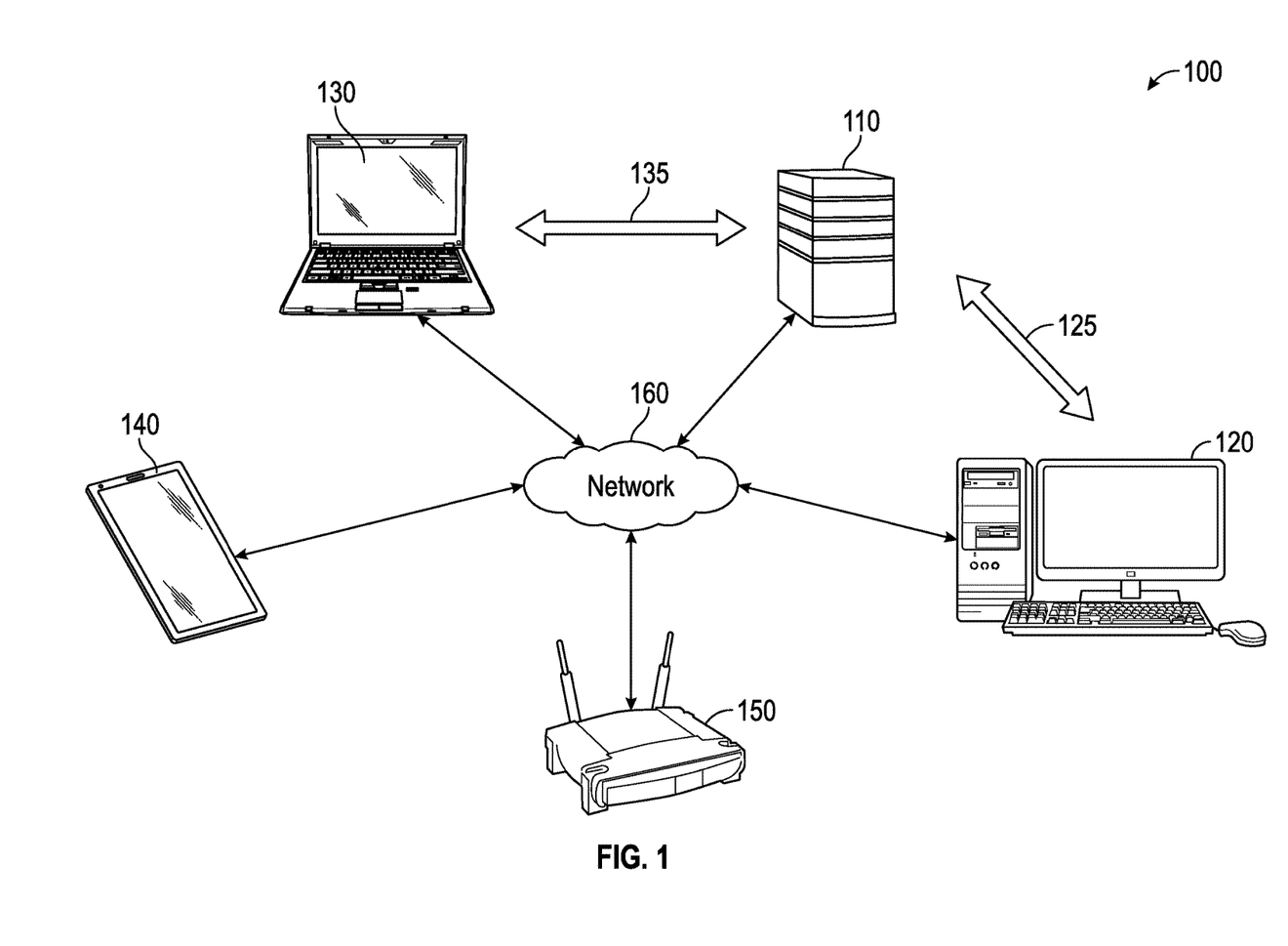
FIG. 1 illustrates an example architecture for an environment in which the subject technology is used.

FIG. 1 illustrates an example architecture 100 for an environment in which the subject technology is used. The architecture 100 includes a server 110 and a computing device (e.g., a workstation) 120 coupled through a communication link 125. In some aspects of the disclosure, the architecture 100 includes a mobile computer 130, a mobile device (e.g., a smartphone or PDA) 140, and an access point 150 communicatively coupled via a network 160. In one or more aspects, the server 110 and the workstation 120 are also connected to the network 160. The access point 150 may facilitate communication of various computers and devices with the network 160. The network 160 can include, for example, any one or more of a personal area network (PAN), a local area network (LAN), a campus area network (CAN), a metropolitan area network (MAN), a wide area network (WAN), a broadband network (BBN), the Internet, and the like. Further, the network 160 can include, but is not limited to, any one or more of the following network topologies, including a bus network, a star network, a ring network, a mesh network, a star-bus network, a tree or hierarchical network, and the like.

In some aspects, the mobile computer 130 is also capable of using a more robust and higher bandwidth communication link 135 similar to the communication link 125 for communicating with the server 110. In some aspects, the mobile computer 130 can have the capabilities of performing the functionalities of the workstation 120 and be actually used to perform those functionalities as disclosed herein. The servers 110 can be any device having an appropriate processor, memory, and communications capability for hosting hardware-assisted verification services, for example, emulation and HDL compilation capabilities. In one or more aspects, the server 110 can host emulation of DUTs, for example, a DUT controllable by software hosted by the workstation 120 or the mobile computer 130. In some aspects, the communication links 125 and 135 are high bandwidth and low latency communication channels (e.g., interfaces) such as the standard co-emulation modeling interface (SCE-MI). The SCE-MI interface can optimize performance and functionality when providing a transactional interface, such as between the workstation 120 and the server 110 or the mobile computer 130 and the server 110. In one or more aspects, a user may access the workstation 120 or the mobile computer 130 via the mobile device 140, for example, to initiate transfer of one or more files or other transactions between the workstation 120 or the mobile computer 130 and the server 110.

Figure 2:
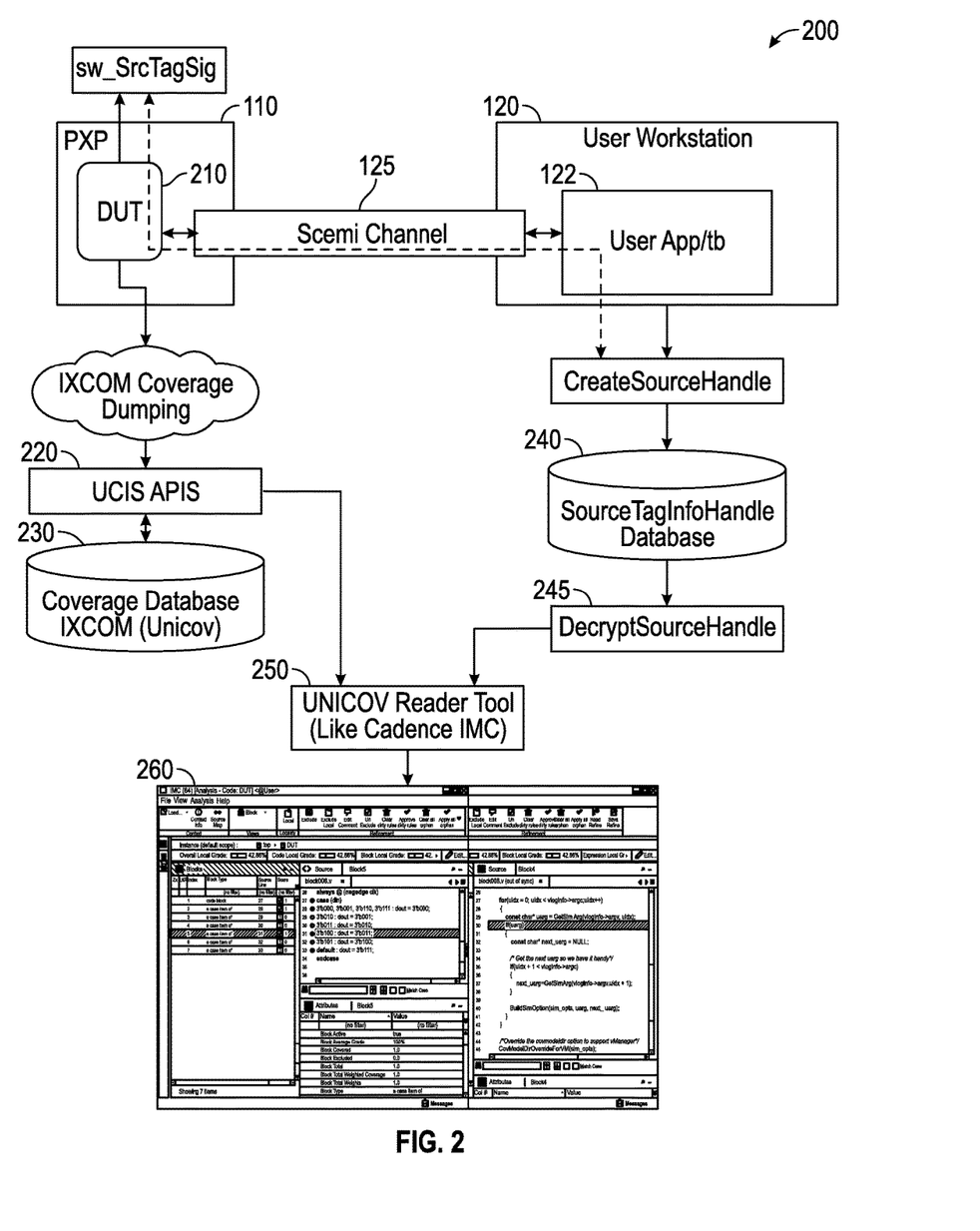
FIG. 2 is a block diagram illustrating an example system for code coverage mapping according to certain aspects of the disclosure.

FIG. 2 is a block diagram illustrating an example system 200 for code coverage mapping according to certain aspects of the disclosure. The system 200 includes the server 110 and the computing device (e.g., a workstation) 120 communicating over the interface 125. The system 200 further includes one or more application program interfaces (APIs) 220. A first database (e.g., a coverage database) 230, a second database 240, a source handle decryption API 245 and a presentation tool 250 that can create a user interface 260 to display code coverage mapping on a display device, for example, of the workstation 120. In some aspects, the server 110 can be a verification computing platform with simulation, acceleration, and emulation capabilities such as a Palladium XP (PXP) machine.

In one or more aspects, the workstation 120 includes one or more user applications 122 that are executable by the workstation 120. The workstation 120 also includes software codes, one or more of which are developed to control a device. The device can be or can include an integrated circuit, the design (e.g., in the form of HDL or RTL code) of which (e.g., DUT 210) is under test (e.g., verification) by the server 110. The disclosed solution allows co-verification of the HDL (or RTL) code representing the DUT and a corresponding software code that is transacting with the HDL (or RTL) code. In the description of the disclosed solution hereinafter, for the purpose of brevity, only the HDL code is mentioned, but it is understood that the subject technology is similarly applicable to RTL codes as well and is by no means limited to HDL codes, as describing the DUT.

In one or more aspects, the software code may transact with the HDL code, for example, a software activity may result in a hardware activity. For instance, a "data send" command on software code software code of any user application leads to an activity in a corresponding HDL running on the server 110, which in turn can result in an HDL coverage (e.g., code or functional coverage). The subject technology enables the user to map the HDL coverage to the respective software code that was responsible for the HDL coverage.

In some aspects, the user application 122 can generate a source-code handle such as a sourceTagInfoHandle for the respective software transaction "data send." The source-code handle is created of the software code line (e.g., file, line combination handle). On the other hand, a compile flow (e.g., in-circuit emulation and simulation acceleration complier (IXCOM)) on the server 110 adds a special signal, for example, called sw_SrcTagSig in the HDL code of the DUT as part of its instrumentation flow. The user application 122 writes a handle value of the source-code handle (e.g., sourceTagInfoHandle), via the interface 125, onto the special signal (e.g., sw_SrcTagSig) in the HDL code of the DUT. Upon starting of the software transaction (e.g., "data send") from the software side (e.g., by the user application 122), a hardware activity starts and HDL coverage instrumentation signals (e.g., block/toggle) are hit that result in recording the value of the sw_SrcTagSig into the coverage instrumentation signals, marking the HDL blocks as covered.

Once the "data send" transaction is complete, the software code clears the sw_SrcTagSig on the server 110 via the interface 125, which causes the information related to the software source code execution being transferred to the HDL coverage logic. The HDL coverage data is created by the compile flow of the server 110 and is dumped into APIs 220 (e.g., in a unified coverage interoperability standard (UCIS) format). The API 220 creates the coverage database 230 (e.g. an IXCOM database). The content of coverage database 230 is loaded in the presentation tool 250 (e.g., an IMC tool), and the value of the "block coverage" instrumentation signal (e.g., _zy_ccov_block_2) is decrypted to get the information about the software source code. The presentation tool 250 loads the database 230 and decrypts the source handles values in coverage counters, using the source handle decryption API 245 to map the exact HDL coverage activity to the software coverage activity and to create the user interface 260 further described herein with respect to FIG. 3.

In some aspects, there is a many-to-one mapping between the software code and the HDL code. In other words, multiple software source code lines can result in the same HDL being executed across different transactions. In one or more aspects of the disclosure, the many-to-one mapping can be handled in two different approaches. In a first approach, the HDL coverage is reset at the start of the software transaction (e.g., the "data send" transaction), and then at the end of the transaction, the coverage database is dumped to a storage medium such as a hard disk (e.g., of the server 110). In such a case, the mapping between the coverage database name and the software transaction needs to be maintained. This can be done by one of two options. In the first option, the value in the special signal (e.g., sw_SrcTagSig) is used. In this case, the value the special signal itself has the information about the software code source. In the second option, user intervention is applied, in which case the size of the special signal can only be 1 bit to mark the start and end of the software transaction. The reset/dump operation can be triggered by an "always" process sensitive to the special signal.

In an alternative approach, the many-to-one mapping can be handled by a set that can be used if the software code is split into multiple sections, and a set value for each section of the multiples sections of the software code is allocated. The set can be realized via a bit vector. For example, when there are six possible software tags for six software functions, then 6 bits are used for each coverage variable and the set {1, 2, 4, 8, 16, 32} is used to encode the software tags, for instance, by an instrumentation logic such as "coverage_varible[5:0]=sw_SrcTagSig."

In the subject technology, the "many-to-one" mapping for software code to HDL can be resolved by the first approach, using the first option, where the value in the special signal is used.

Figure 3:
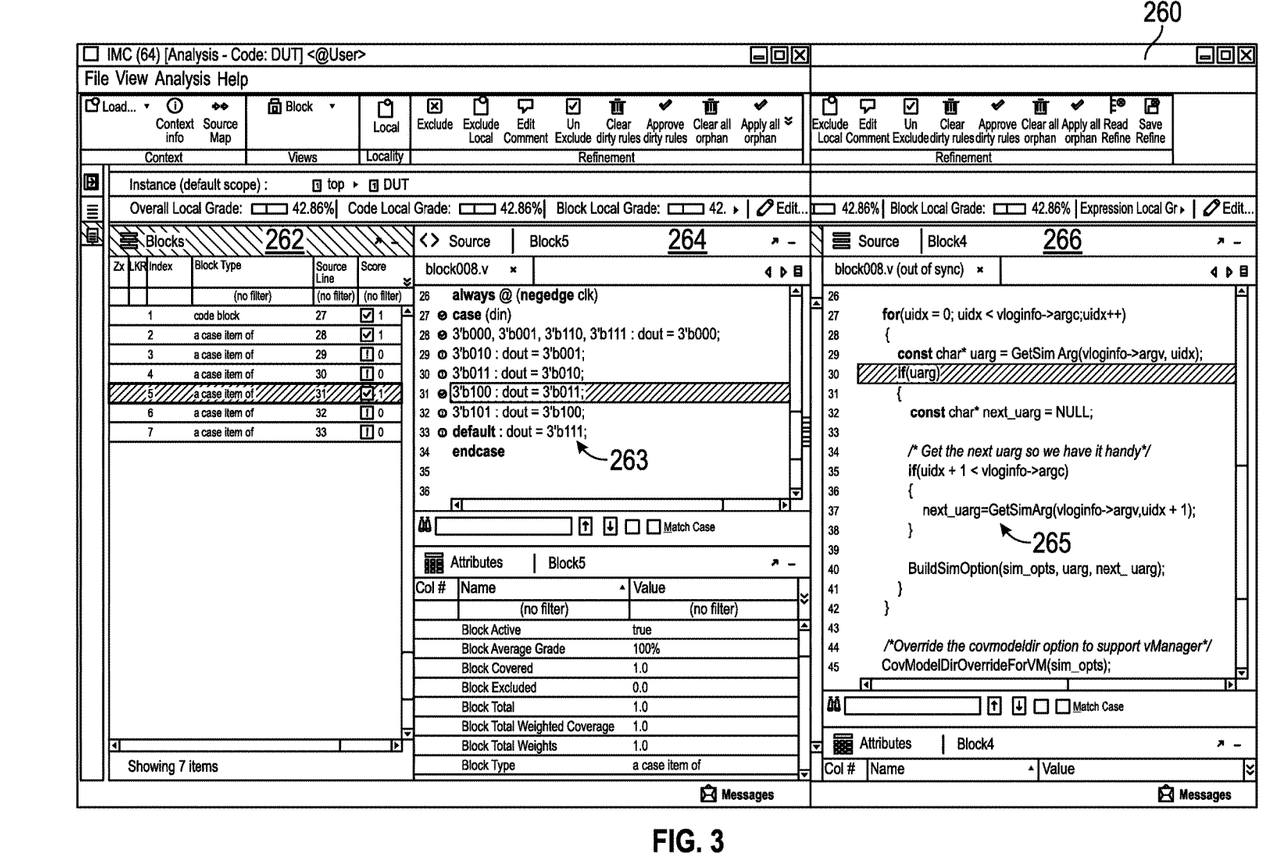
FIG. 3 is a screenshot illustrating an example user interface showing a hardware description language (HDL) code coverage mapped to a software coverage according to certain aspects of the disclosure.

FIG. 3 is a screenshot illustrating an example user interface 260 showing a hardware description language (HDL) code coverage mapped to a software coverage according to certain aspects of the disclosure. The user interface 260 includes three main windows 262, 264, and 266. The window 262 shows the block coverage for the HDL code shown in window 264, where the scores indicate coverage (1) and non-coverage (0) for a specific HDL source line. For example, for source line 31, the score is 1, which indicates that source line 31 was included in the HDL coverage. The HDL source 263 is viewed in the coverage viewer tool of window 264. The window 266 shows a block 265 of the software code (e.g., C++ code) that transacted with the HDL code of window 264 and is mapped to the HDL code.

Figure 4:
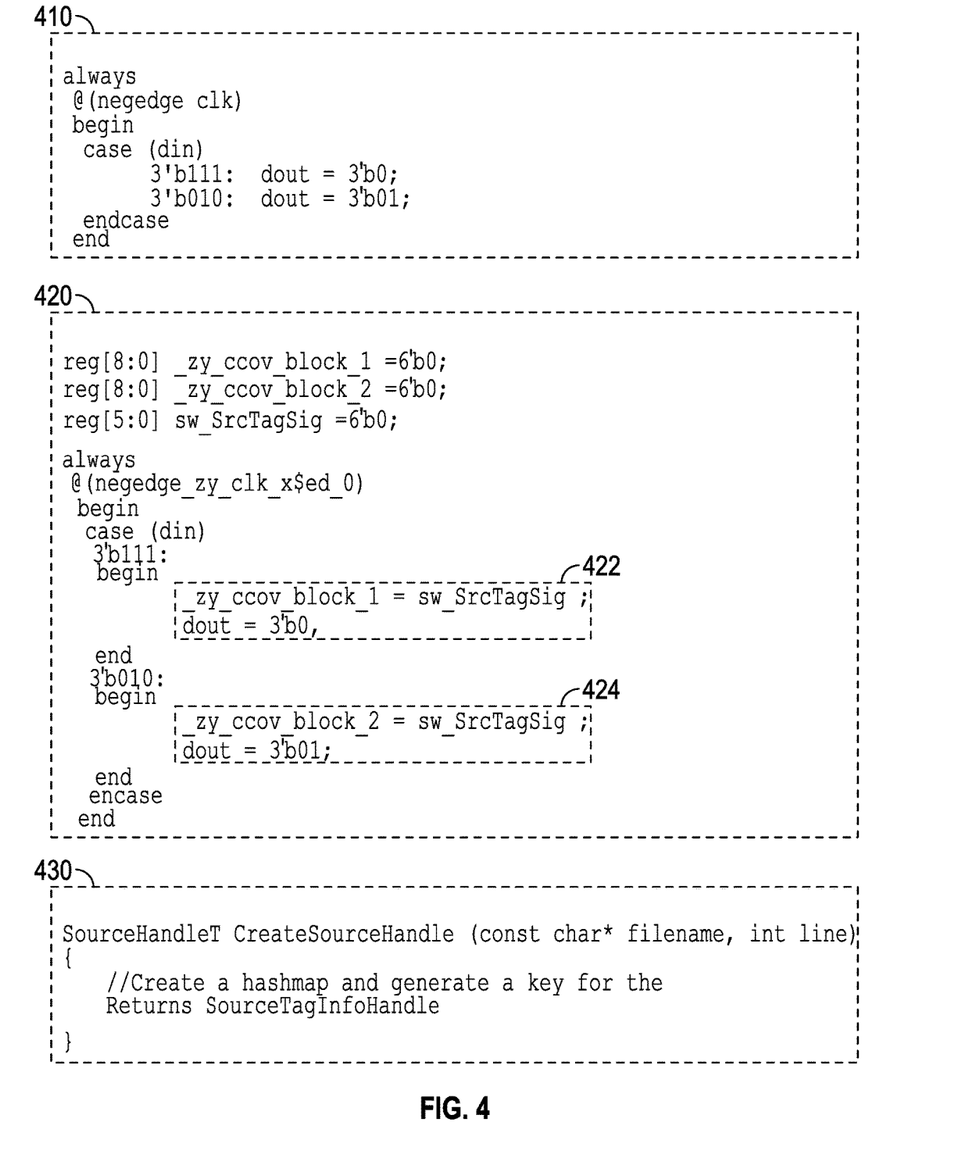
FIG. 4 is a diagram illustrating example source codes of an original HDL, a transformed HDL, and software code change, respectively, according to certain aspects of the disclosure.

In some aspects of the disclosure, the mapping between the line numbers of the HDL code and the software code is managed by the sw_SrcTagSig value. The HDL code 410 of FIG. 4 is translated to software code 420 of FIG. 4, using IXCOM. As part of a step IXCOM 512 of FIG. 5, the mapping between an original HDL line number of the HDL code 410 and the software code 420 (e.g., translated HDL) is maintained. Further, the information related to the block specific translation (e.g., 422 of FIG. 4) is also maintained. In the process of dumping the coverage database (e.g., using 220 of FIG. 2), the original HDL line number of 410 is added in the Unicov Coverage database (e.g., 230 of FIG. 2) along with the value of _zy_ccov_block_1 (e.g., 422 of FIG. 4). The value of _zy_ccov_block_1 is the sw_SrcTagSig, which is the software code line handle 430 of FIG. 4. This provides for the coverage database 230 to have references to both the HDL source code and the software code line handle. The Unicov Reader tool 250 of FIG. 2 can load both the HDL source file, and the software source file, and set the file markers to the correct line.

FIG. 4 is a diagram illustrating example source codes 410, 420, and 430 of an original HDL, a transformed HDL, and software code change, respectively, according to certain aspects of the disclosure. The original HDL source code 410 is the result of the simulation, acceleration, and emulation by the server 110 of FIG. 2. The original HDL source code 410 is modified (e.g., transformed), according to some aspects of the subject technology, by the compile flow (e.g., IXCOM) on the server 110. The modification includes addition of instrumentation signals 422 and 424 to the original HDL code 410. According to one or more aspects of the disclosure, the software side is also modified and the change in the software code is shown in window 430.

Figure 5:
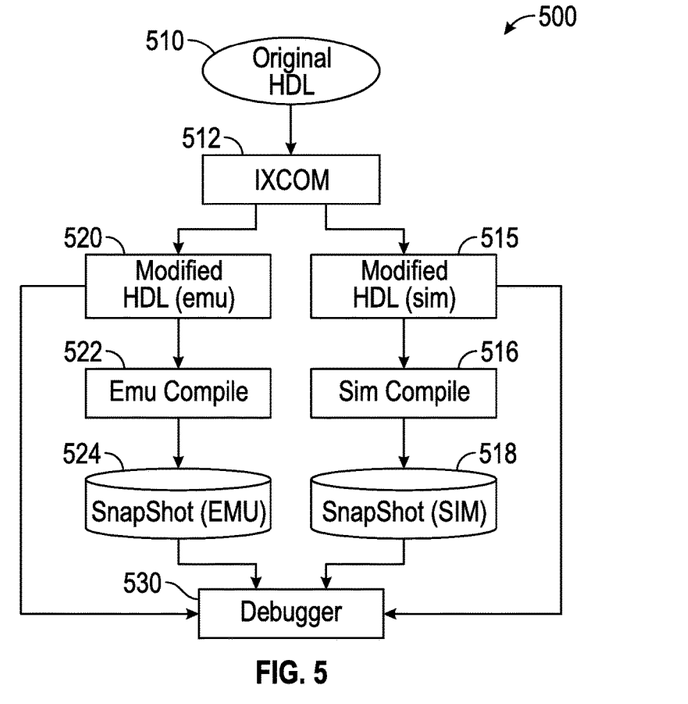
FIG. 5 is a flow diagram illustrating an example HDL compiler flow according to certain aspects of the disclosure.

FIG. 5 is a flow diagram illustrating an example HDL compiler flow 500 according to certain aspects of the disclosure. The complier flow 500 is implemented by the compile flow (e.g., IXCOM) on the server 110. The original HDL 510 is compiled by the IXCOM 512 and passed to two separate routes: a simulation route and an emulation route. In the simulation route, according some aspects of the subject technology, the IXCOM 512 inserts a software source tag signal as part of the instrumentation and provides a simulation modified HDL 515, which is passed to a simulation compiler stage 516. The output of the simulation compiler stage 516 is stored in a simulation snapshot database 518 that is accessible by a debugger 530.

In the emulation route, the IXCOM 512 inserts, according some aspects of the subject technology, a software source tag signal as part of the instrumentation and provides a emulation modified HDL 520, which is passed to a emulation compiler stage 522. The output of the emulation compiler stage 522 is stored in an emulation snapshot database

524. The information stored in the emulation snapshot database 524 is accessible by the debugger 530.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
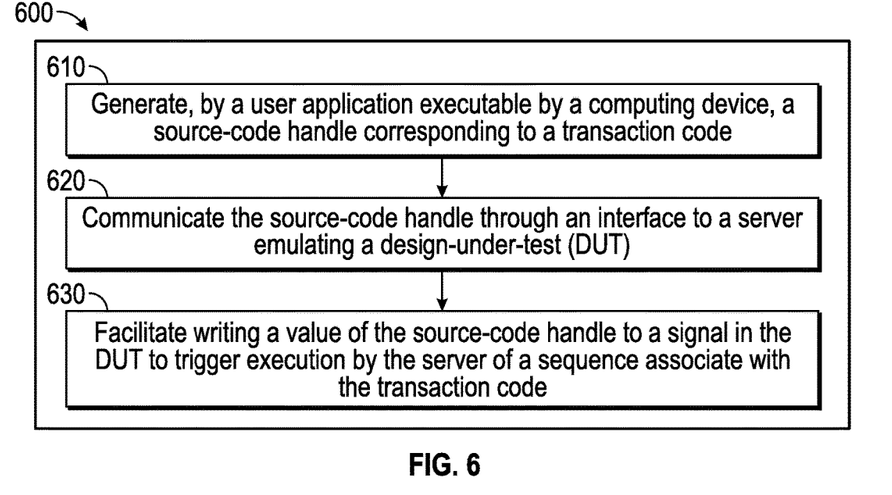
FIG. 6 illustrates an example process for code coverage mapping according to certain aspects of the disclosure.

FIG. 6 illustrates an example process 600 for code coverage mapping using the system 200 of FIG. 2 according to certain aspects of the disclosure. While FIG. 6 is described with reference to FIG. 2, it should be noted that the process steps of FIG. 6 may be performed by other systems. The process 600 begins by proceeding to step 610, when a user application (e.g., 122 of FIG. 2) executable by a computing device (e.g., 120 of FIG. 2) generates a source-code handle corresponding to a transaction code. The process 600 continues with the source-code handle being communicated through an interface (e.g., 125 of FIG. 2) to a server (e.g., 110 of FIG. 2) emulating a DUT (e.g., 210 of FIG. 2). The process 600 further continues with writing (e.g., by 122 of FIG. 2 via 125 of FIG. 2) a value of the source-code handle to a signal (e.g., 422 or 424 of FIG. 4) in the DUT to mark start of execution by the user application of a sequence (e.g., codes in 264 of FIG. 3) associate with the transaction code and the process 300 ends.

Hardware Overview

Figure 7:
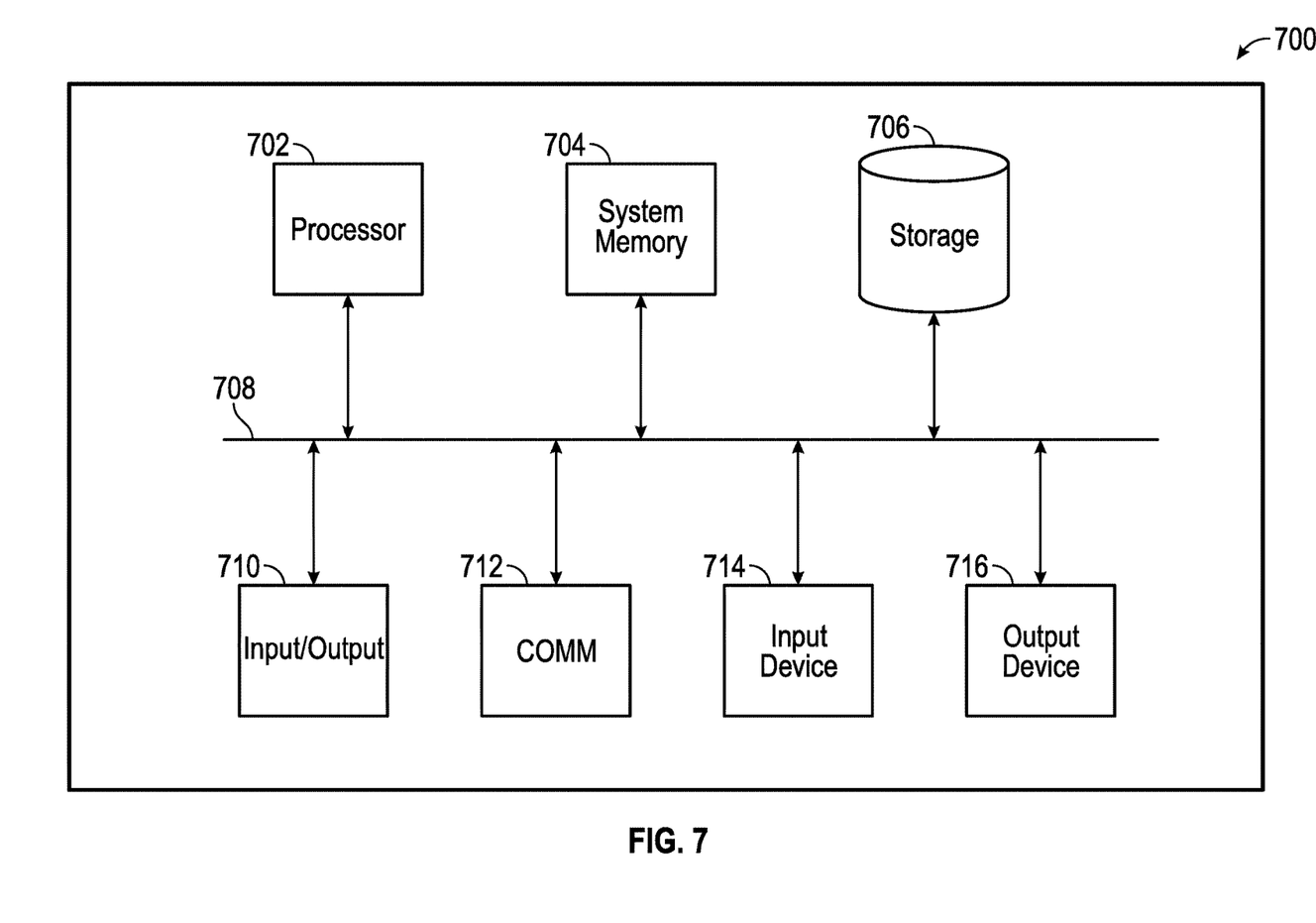
FIG. 7 is a block diagram illustrating an example computer system with which code coverage mapping can be implemented.

FIG. 7 is a block diagram illustrating an example computer system 700 with which code coverage mapping can be implemented. In some aspects, the computer system 700 may represent the server 110, the computing device 120, the mobile computer 130, and the mobile device 140 of FIG. 1. In certain aspects, the computer system 700 may be implemented using hardware or a combination of software and hardware, either in a dedicated server, or integrated into another entity, or distributed across multiple entities.

Computer system 700 (e.g., server 110 or the computing device 120) includes a bus 708 or other communication mechanism for communicating information, and a processor 702 coupled with bus 708 for processing information. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., interface 125 of FIG. 2) may include networking interface cards, such as Ethernet cards and modems.

The components of the system can be interconnected by any form or medium of digital data communication, e.g., a communication network. The communication network (e.g., network 160 of FIG. 1) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, near-field communications (NFC), or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 702 as it is received, and/or stored in data storage 706 for later execution.

In certain aspects, the input/output module 710 is configured to connect to a plurality of devices, such as an input device 714 and/or an output device 716. Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, the server 110 and work station 120 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system for code coverage mapping, the system comprising:
    a server configured to emulate a design-under-test (DUT);
    an interface coupling the server to a computing device configured to execute software codes including a user application; and
    a presentation tool configured to perform many-to-one mapping between software code and a hardware description language (HDL) code,
    wherein the user application is configured to generate a source-code handle and to use the interface to write a value of the source-code handle to a signal in the DUT by tagging a specially instrumented predefined code, the signal to mark start of execution of a sequence by the user application, and
    wherein the server is further configured to allow reducing hardware by facilitating identification of unrelated portions of the HDL code.

2. The system of claim 1, wherein the user application is further configured to clear the signal when the execution of the sequence is complete.

3. The system of claim 1, wherein the server is configured to use one or more application program interfaces (APIs) to store a compiled HDL coverage into a first database in a format, wherein the format comprises a unified coverage interoperability standard (UCIS) format.

4. The system of claim 3, wherein the user application is further configured to store an encrypted source-code handle in a second database.

5. The system of claim 4, wherein the presentation tool is configured to decrypt the encrypted source-code handle in one or more coverage counters, and wherein the presentation tool is further configured to map a HDL coverage activity to a corresponding software coverage activity.

6. The system of claim 5, further comprising a user interface configured to display the HDL coverage activity alongside the corresponding software coverage activity.

7. The system of claim 1, wherein the server comprises a platform including a compile flow configured to compile HDL code, and wherein the interface comprises a standard co-emulation modeling interface (SCE-MI).

8. The system of claim 1, wherein the source-code handle comprises a handle of a software code, wherein the handle includes information related to a file associated with the software code and a line within the software code, wherein the signal comprises a source-code tag signal, and wherein the sequence comprises a portion of a source code associated with a transaction with the DUT.

9. A computer implemented method for coverage mapping comprising:
    generating, by a user application executable by a computing device, a source-code handle corresponding to a transaction code;
    communicating the source-code handle through an interface to a server emulating a design-under-test (DUT), wherein the server facilitates identification of unrelated portions of a hardware description language (HDL) code to reduce hardware;
    performing, by a presentation tool, a many-to-one mapping between software code and the HDL code; and
    facilitating writing, tagging a specially instrumented predefined code, a value of the source-code handle to a signal in the DUT to mark start of execution by the user application of a sequence associated with the transaction code.

10. The computer implemented method of claim 9, wherein the method further comprises clearing the signal when the execution of the sequence associate with the transaction code is complete.

11. The computer implemented method of claim 9, further comprising storing, using one or more application program interfaces (APIs), a compiled HDL coverage into a first database in a format, where the format comprises a unified coverage interoperability standard (UCIS) format.

12. The computer implemented method of claim 11, further comprising using the user application to store an encrypted source-code handle in a second database.

13. The computer implemented method of claim 12, further comprising decrypting, using the presentation tool, the encrypted source-code handle in one or more coverage counters, and mapping a HDL coverage activity to a corresponding software coverage activity.

14. The computer implemented method of claim 13, further comprising providing a user interface for display of the HDL coverage activity alongside the corresponding software coverage activity.

15. The computer implemented method of claim 9, wherein the server comprise a platform including a compile flow configured to compile HDL code, and wherein the interface comprises a standard co-emulation modeling interface (SCE-MI).

16. The computer implemented method of claim 9, wherein generating the source-code handle comprises generating a handle of a software code, wherein the handle includes information related to a file associated with the software code and a line within the software code.

17. The computer implemented method of claim 9, wherein the signal comprises a source-code tag signal, and wherein the transaction code represents a transaction between the software code and the DUT.

18. A non-transitory machine-readable storage medium comprising machine-readable instructions for causing a processor to execute a method for code coverage mapping, comprising:

generating a source-code handle corresponding to a transaction code;

communicating the source-code handle through an interface to a server emulating a design-under-test (DUT);

facilitating writing a value of the source-code handle to a signal in the DUT by tagging a specially instrumented predefined code to mark start of execution by the user application of a sequence associate with the transaction code; and performing a many-to-one mapping between software code and a hardware description language (HDL) code, wherein:

the server facilitates identification of unrelated portions of the HDL code to reduce hardware, the source code handle comprises a handle of the software code, and the transaction code represents a transaction between the software code and the DUT.

19. The non-transitory machine-readable storage medium of claim 18, wherein the method further comprises storing an encrypted source-code handle in a second database, and decrypting, using the presentation tool, the encrypted source-code handle in one or more coverage counters.

20. The non-transitory machine-readable storage medium of claim 18, wherein the method further comprises mapping an HDL coverage activity to a corresponding software coverage activity.

* * * * *